(No Model.)
C. T. LEE.
INSULATOR.
No. 485,106. Patented Oct. 25, 1892.
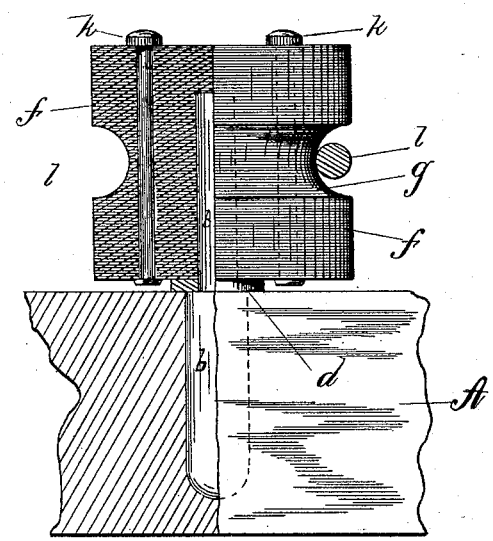
Witnesses
Arthur F. Randall
Robert Wallace
Inventor
Charles Tennant Lee
by Macleod Calver & Randall
his attys

UNITED STATES PATENT OFFICE.

CHARLES TENNANT LEE, OF BOSTON, MASSACHUSETTS, ASSIGNOR TO THE JOHNS-PRATT COMPANY, OF HARTFORD, CONNECTICUT.

INSULATOR.

SPECIFICATION forming part of Letters Patent No. 485,106, dated October 25, 1892.

Application filed March 17, 1892. Serial No. 425,272. (No model.)

*To all whom it may concern:*

Be it known that I, CHARLES TENNANT LEE, a citizen of the United States, residing at Boston, in the county of Suffolk, and State of Massachusetts, have invented certain new and useful Improvements in Insulators, of which the following is a specification, reference being had therein to the accompanying drawing.

My invention has for its object to produce a pole-insulator adapted more particularly for outdoor use and which shall be durable and efficient; and it consists in an insulator composed of a series of sheets of mica laid and pressed together and firmly secured and provided with a spindle or support, all as is hereinafter set forth, and particularly pointed out in the claims.

I have shown my invention in the best form now known to me in the accompanying drawing, in which the figure is an elevation partially in section.

A is a cross-arm or other similar support for a pole-insulator.

$b$ is a rod or spindle, preferably of metal and adapted at its lower end to be set in a socket or hole in the support A. The upper end of the rod or spindle may be of less diameter than the lower portion, forming a shoulder thereon, as shown. A collar $d$ is preferably placed on the upper portion of the spindle, as shown in the drawing, above the shoulder, to form a seat or rest for the layers of mica which form the body of insulating material $f$. The insulating portion or block $f$ is composed of layers of mica superimposed and each provided with an aperture, preferably central thereof, to receive the spindle $b$, and a hole for each of the compressing and retaining bolts. The spindle $b$ may pass through or nearly through the mass of insulating material. In case it is designed to pass only partially through the insulating-block, the sheets of mica above the spindle will not require to be provided with a central aperture, as will be clear from the drawing. After the sheets of mica are laid together and closely compacted by suitable pressure the bolts $k$, which have been previously inserted in the holes provided for them, are securely riveted or headed over, firmly holding the compacted sheets of mica together and forming a solid insulating-block. The number of bolts $k$ employed may be varied. I prefer to use three at least. After the block has been thus formed it may be put into a lathe and smoothed and finished or given any form desired. The annular groove to receive the wire $l$ is preferably formed in this way. After the block is finished it is ready to be placed on the spindle $b$ and put into use.

What I claim is—

1. An insulator comprising an insulating-block composed of a series of sheets of mica and means whereby said sheets are suitably secured together, combined with a spindle or support therefor passing partially through said block, substantially as shown and described.

2. The combination, in an insulator, of the insulating-block $f$, the securing-bolts $k$, and the spindle $b$, substantially as set forth.

In testimony whereof I affix my signature in presence of two witnesses.

CHARLES TENNANT LEE.

Witnesses:
WM. A. MACLEOD,
ROBT. WALLACE.